United States Patent [19]
Iijima

[11] 3,952,614
[45] Apr. 27, 1976

[54] AUTOMATIC POWER TRANSMISSION HYDRAULIC CONTROL THROTTLE VALVE

[75] Inventor: Tetsuya Iijima, Tokyo, Japan

[73] Assignee: Nissan Motor Company Limited, Yokohama, Japan

[22] Filed: Oct. 3, 1974

[21] Appl. No.: 511,722

[30] Foreign Application Priority Data
Oct. 6, 1973 Japan............................ 48-111933

[52] U.S. Cl.................................. 74/865; 74/868
[51] Int. Cl.² ........................................ B60K 21/00
[58] Field of Search ............ 74/863, 864, 865, 869, 74/867

[56] References Cited
UNITED STATES PATENTS

| | | | |
|---|---|---|---|
| 3,410,159 | 11/1968 | Zundel................................. | 74/863 |
| 3,583,259 | 6/1971 | Shimosaki.......................... | 74/869 X |
| 3,613,484 | 10/1971 | Pierce et al...................... | 74/864 X |
| 3,625,322 | 12/1971 | Nagamatsu ........................... | 74/864 |
| 3,724,294 | 4/1973 | Gaus.................................... | 74/863 |

Primary Examiner—Samuel Scott
Assistant Examiner—P. S. Lall

[57] ABSTRACT

A hollow first valve spool has large and small valve lands and an outlet port which is formed therebetween communicating with a throttle pressure passage. A second valve spool having a valve land with a width equal to that of the outlet port is operatively connected with the accelerator of an engine and is telescopically received in the first valve spool. The first valve spool is biased by the hydraulic pressure in the passage and a spring in opposite axial directions and is balanced when in a neutral position in which the land of the second valve spool registers with the outlet port. Movement of the first valve spool in any direction from the neutral position relative to the second valve spool causes communication of the outlet port with a pressurized hydraulic fluid inlet port and with a hydraulic fluid drain port so that the first valve spool is returned into the neutral position by the hydraulic pressure in the passage and by the spring, respectively.

6 Claims, 3 Drawing Figures

AUTOMATIC POWER TRANSMISSION HYDRAULIC CONTROL THROTTLE VALVE

The present invention relates generally to a hydraulic control system of an automatic power transmission of a motor vehicle and particularly to a new and improved throttle valve for such a hydraulic control system.

As is well known in the art, a hydraulic control system of this type includes a throttle valve producing a throttle pressure which varies in accordance with engine torque or load demands and which is used to control a working or line pressure and vehicle speed at which an automatic gear shift should take place. A typical throttle valve is operatively connected with an engine throttle butterfly valve to produce a throttle pressure which varies in proportion to the degree of opening of the engine throttle valve. However, a conventional throttle valve of this type has been biased by a hydraulic force which requires a relatively large effort of the vehicle driver when he depresses the accelerator pedal. Furthermore, the hydraulic control system as hereinbefore referred to is usually constructed to produce a kickdown pressure which is supplied to a shift valve to cause a force downshift or kickdown when the driver depresses the accelerator pedal to its full extent for accelerating the vehicle to pass a preceding motor vehicle. To this end, a conventional hydraulic control system has been provided with a kickdown valve separately from a throttle valve. As a result, the construction of the conventional hydraulic control system has been complicated.

It is, therefore, an object of the invention to provide a novel and improved throttle valve which enables the vehicle driver to depress the accelerator pedal by a considerably reduced effort.

It is a further object of the invention to provide a novel and improved throttle valve which also functions as a kickdown valve.

These and other objects and advantages of the invention will become more apparent from the following detailed description taken in conjunction with the accompanying drawings in which.

Figure 1:
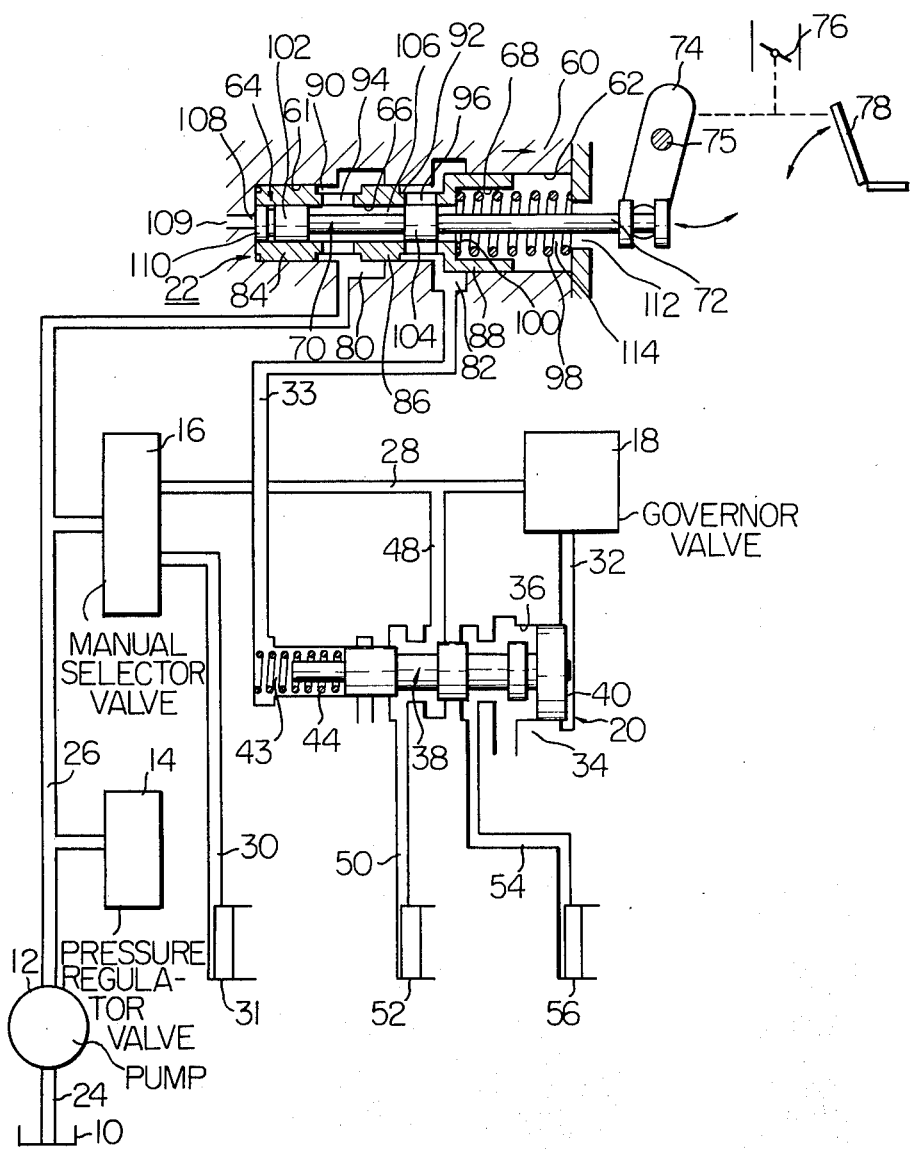
FIG. 1 is a schematic line diagram of a preferred embodiment of a hydraulic control system according to the invention.

Referring to FIG. 1, a hydraulic control system is shown to include a hydraulic fluid sump or reservoir tank 10, a pump 12, a pressure regulator valve 14, a manual selector valve 16, a governor valve 18, a shift valve 20 such as a 1–2 shift valve, and a throttle valve 22 according to the invention. These component elements form part of the hydraulic control system. Other various component elements forming the hydraulic control system are omitted. The pump 12 draws hydraulic fluid from the reservoir tank 10 by way of a passage 24 and pumps or discharges hydraulic fluid under pressure as a control or line pressure into a control or line pressure passage 26 interconnecting the pressure regulator valve 14, the manual selector valve 16 and the throttle valve 22. The pump 12 is driven by a prime mover or an engine of a motor vehicle (not shown) equipped with an automatic power transmission controlled by the hydraulic control system. The line pressure discharged into the passage 26 flows to the pressure regulator valve 14 and is regulated at a predetermined value. The manual selector valve 16 has various forward driving gear ratio positions and a reverse driving gear ratio position which are attainable by manipulating a manually operated gear selector lever or the like (not shown). The manual selector valve 16 delivers the line pressure in the passage 26 to a passage 28 communicating with the governor valve 18 and the shift valve 20, when in the forward driving gear ratio position. The manual selector valve 16 also delivers the line pressure to a passage 30 communicating with a servo motor 31, to cause operation thereof when in the reverse driving gear ratio position. The servo motor 31, when operated, causes the application of a reverse brake (not shown) of the transmission which forms one of friction elements for establishing a reverse driving gear ratio. The governor valve 18 is operated by a transmission output shaft (not shown) and generates a governor pressure varying in accordance with the vehicle speed and fed into a passage 32. The shift valve 20 has a valve body 34 formed with a valve chamber 36 therein, and a valve spool 38 slidably fitted in the valve chamber 36. The passage 32 communicates with a space 40 between the valve spool 38 and the right end wall surface in the drawing of the valve chamber 36 for supply of the governor pressure into the space 40. The governor pressure biases the valve spool 38 to the leftmost position in the drawing. A throttle pressure passage 33 communicates with the throttle valve 22 and communicates with a space 43 between the valve spool 38 and the left end wall surface in the drawing of the valve chamber 36 for supply of the throttle pressure into the space 43. The throttle pressure biases the valve spool 38 to the rightmost position shown in the drawing. A compression spring 44 is disposed between the valve spool 38 and the left end of the valve chamber 36 to bias the valve spool 38 to the rightmost position. The valve spool 38 is moved into the leftmost position by the force of the governor pressure overcoming the force of the throttle pressure and the action of the spring 44 to provide an automatic gear shift when the vehicle reaches a pedetermined speed. When the valve spool 38 is in the rightmost position, it provides fluid communication between a branch passage 48 of the passage 28 and a passage 50 communicating with a servo motor 52, to deliver the line pressure thereto to cause operation of the servo motor 52. When the valve spool 38 is in the leftmost position, it provides fluid communication between the branch passage 48 and a passage 54 communicating with a servo motor 56, to deliver the line pressure thereto to cause operation of the servo motor 56. The operated servo motor 52 causes the application of a low speed brake (not shown) of the transmission which forms one of the friction elements for establishing a forward driving low speed ratio. The operated servo motor 56 causes the engagement of a high speed clutch (not shown) of the transmission which forms one of the friction elements for establishing a forward driving high speed ratio.

The throttle valve 22 comprises a valve body 60 which is formed with smaller and larger stepped bores or valve chambers 61 and 62 therein, a first spool valve having a hollow valve spool 64 which is slidably fitted in the valve chamber 62 and formed with smaller and larger stepped bores 66 and 68 coaxially extending through the spool 64, and a second spool valve having a valve spool 70 which is axially slidably fitted in the smaller bore 66 and a stem 72 which is fixedly attached to the spool 70. The spools 64 and 70 are slidable relative to each other. A lever 74 is swingable around a fulcrum pin 75 and is operatively connected at one end with the stem 72 and at the other with the throttle valve 76 of the engine and with a prime mover acceleration control member or an accelerator pedal 78 of the vehicle by way of a suitable mechanical linkage as shown in broken lines in the drawing, so that movement of the accelerator pedal 78 causes a corresponding movement of the spool 70 and thus the position of the spool 70 varies in accordance with the position of the accelerator pedal 78. The stem 72 of the spool 70 may be operatively connected with a diaphragm of a diaphragm unit (not shown) which is operated by vacuum in an intake manifold of the engine, in lieu of the engine throttle valve and the accelerator pedal.

The valve chamber 62 is provided with a first annular recess or inlet port 80 which communicates with the line pressure passage 26 and a second annular recess or outlet port 82 which communicates with the throttle pressure passage 33. The spool 64 has spaced first, second and third valve lands 84, 86 and 88 and first and second annular recesses 90 and 92 between the valve lands 84 and 86 and between the valve lands 86 and 88, respectively. The land 86 has a diameter identical with that of the land 84 and smaller than that of the land 88. The annular recesses 90 and 92 at all times communicate with the inlet and outlet ports 80 and 82, respectively. The spool 64 also has spaced inlet and outlet ports 94 and 96 which open into the bore 66 and into the annular recesses 90 and 92, respectively. A compression spring 98 is disposed between a step 100 formed on the spool 64 between the bores 66 and 68 and the right end in the drawing of the chamber 62 to bias the spool 64 in a left-hand direction in the drawing. The left end wall surface in the drawing of the valve chamber 62 serves as a stop to limit the movement of the spool 64 in the left-hand direction. The spool 70 has spaced first and second valve lands 102 and 104 with an identical diameter, and an annular groove 106 which is formed between the valve lands 102 and 104. The inlet port 94 at all times communicates with the annular groove 106 so that the line pressure in the passage 26 is supplied into the valve chamber 62 at a location between the lands 102 and 104. Since the diameters of the lands 102 and 104 are equal to each other and there is no spring biasing the spool 70, the hydraulic and mechanical force differential biasing the spool 70 in any direction is substantially zero. The land 102 is positioned between the left open end in the drawing of the bore 66 and the inlet port 94 to obstruct communication between the left open end of the bore 66 and the inlet port 94. The land 104 controls the outlet port 96 and the length or width of the land 104 is approximately identical with the width of the outlet port 96. The valve chamber 62 is also provided with a first drain port 108 which communicates with the sump 10 by way of a drain line 109 to vent a space 110 between the left end wall surface of the valve chamber 62 and the land 88 to the sump 10, and a second drain port 112 which communicates with the sump 10 to vent a space 114 between the right end wall surface of the valve chamber 62 and the land 104 to the sump 10. The spool 64 has a neutral position shown in the drawing which is constant relative to the spool 70 and in which the land 104 registers with or closes the outlet port 96. The spool 64 is biased rightwards by the hydraulic pressure in the passage 33 acting on the area differential between the lands 88 and 86. When the spool 64 is moved right or left in the drawing from the neutral position relative to the spool 70, the land 104 opens the outlet port 96 to provide communication between the annular groove 106 and the outlet port 96 and between the outlet port 96 and the space 114 to effect delivery of pressurized hydraulic fluid from the groove 106 to the throttle pressure passage 33 and discharge of hydraulic fluid from the passage 33 to the space 114, respectively.

The operation of the throttle valve 22 constructed according to the invention is as follows.

When the accelerator pedal 78 is moved in an engine speed increasing direction, the spool 70 is moved rightwards relative to the spool 64 and the spool 64 is spaced from the neutral position so that the outlet port 96 is opened to the annular groove 106 to effect an increase in the hydraulic pressure in the throttle pressure passage 33. The increased hydraulic pressure in the passage 33 moves the spool 64 into the neutral position against the force of the spring 98. When the valve spool 64 is further moved rightwards past the neutral position, the outlet port 96 is opened to the space 114 to effect a reduction in the hydraulic pressure in the passage 33 so that the spool 64 is returned to the neutral position by the force of the spring 98 overcoming the reduced force of the hydraulic pressure acting on the valve spool 64. When the accelerator pedal 78 is moved in an engine speed reducing direction, the spool 70 moves leftwards relative to the spool 64, the outlet port 96 is opened to the space 114 to effect a reduction in the hydraulic pressure in the passage 33 so that the spool 64 is returned to the neutral position, similarly as mentioned above. Thus, when one of the spools 64 and 70 is moved relative to each other so that the spool 64 is spaced from the neutral position, the spool 64 is moved into and positioned in the neutral position by the force of the increased hydraulic pressure in the passage 33 acting on the spool 64 overcoming the force of the spring 98 or by the force of the spring 98 overcoming the force of the reduced hydraulic pressure in the passage 33 acting on the spool 64. Thus, the spool 64 is balanced in the neutral position. Accordingly, the position of the spool 64 depends on the position of the accelerator pedal 78 when the spool 64 is in the neutral position. When the spool 64 is in the neutral position, the force of the hydraulic pressure or throttle pressure $P_{th}$ in the passage 33 is equal to the force F of the spring 98 divided by the difference A between the areas of the lands 88 and 86, that is, $$P_{th} = F/A$$

The position of the spool 64 varies with the position of the spool 70 and the displacement of the spool 64 is equal to the displacement of the spool 70. Since the force of the spring 98 is equal to the spring constant thereof multiplied by the displacement of the spool 64, the force of the spring 98 and accordingly the throttle pressure are increased and reduced with an increase and a reduction in the displacement of the spool 64. Since the displacement of the spool 70 is nearly proportional to the displacement of the accelerator pedal 78 and accordingly to the degree of opening of the engine throttle valve 76, the throttle pressure is nearly proportional to the engine throttle opening degree. The relationship or characteristics between the throttle pressure $P_{th}$ and the engine throttle opening degree S is shown by the solid line in FIG. 2.

It will be understood that the first valve spool 64 is kind of a pressure modulator valve, since it controls or modulates the hydraulic pressure in the passage 33 to the throttle pressure depending on the position of the accelerator pedal 78, and that the second valve spool 70 is kind of a pilot valve, since it causes the first valve spool 64 to be moved into the neutral position by the hydraulic pressure in the passage 33 when it is moved relative to the first valve spool 64.

Figure 2:
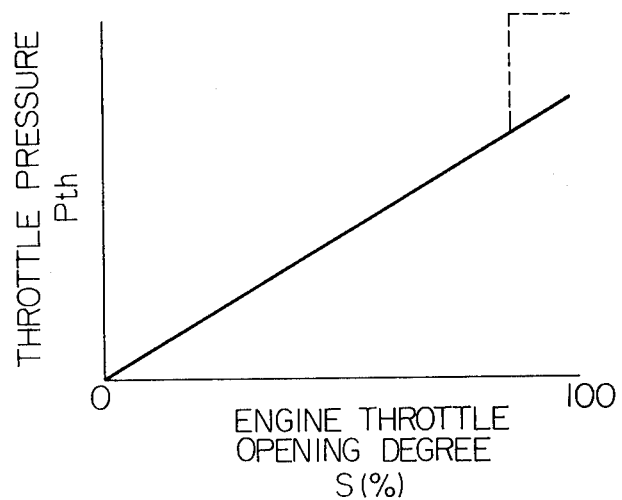
FIG. 2 is a graphic representation of the relationship between throttle pressures produced by a throttle valve according to the invention and the degree of opening of an engine throttle valve.
Figure 3:
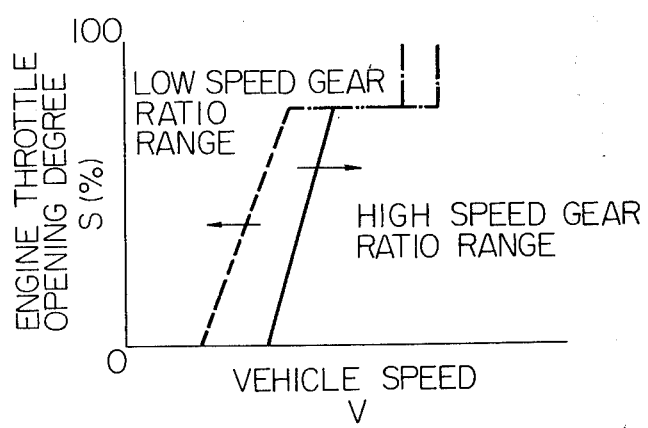
FIG. 3 is a graphic representation of engine throttle valve opening degree and vehicle speed at which an automatic gear shift will take place.

If desired, the valve chamber 62 and the spool 64 may be constructed to limit the movement of the spool 64 so that it reaches the rightmost or utmost position in the drawing in which it is abutting the right end wall surface of the valve chamber 62 when the accelerator pedal 78 is depressed to the vicinity of its full extent and the spool 64 is moved into its neutral position. In this instance, when the accelerator pedal 78 is depressed beyond the vicinity of the full extent, the spool 64 is prevented from being moved into the neutral position and remains spaced from the neutral position so that the outlet port 96 remains open to the annular groove 106 to maintain the hydraulic pressure in the passage 33 at the level of the line pressure in the passage 26. The throttle pressure or line pressure in the passage 33 which is discontinuously higher than the throttle pressure varying in proportion to the position of the accelerator pedal is supplied to the shift valve 20 and serves as a kickdown pressure which effects a forced downshift or a kickdown of the transmission. The relationship between the kickdown pressure $P_{th}$ and the engine throttle opening degree S in the range beyond the vicinity of a fully open position is shown by the broken line in FIG. 2. In this instance, the pattern of automatic gear shifts established by the shift valve 20 includes kickdown and regular automatic gear shifts in dependence on vehicle speed and carburettor throttle valve position as shown in broken lines in FIG. 2 illustrating kickdown as well as the usual automatic gear shifts in FIG. 3.

It will be appreciated that a throttle valve according to the invention has the advantage in that a force for manipulating or depressing an accelerator pedal 78 is considerably reduced, since the hydraulic force differential biasing a second valve spool 70 to withstand the force of the accelerator pedal tending to move the spool 70 when the accelerator pedal 78 is depressed is approximately zero because of first and second valve lands of the spool 70 having an identical area.

It will be appreciated that a throttle valve according to the invention has a further advantage in that an automatic power transmission hydraulic control system can dispense with a kickdown valve and conduits interconnecting a shift valve and the kickdown valve and interconnecting a line pressure conduit and the kickdown valve and as a result, the construction of the hydraulic control system is considerably simplified by employing a throttle valve which also serves as a kickdown valve by constructing it so as to merely select the length of the bore 62 to limit the displacement of a first valve spool 64.

What is claimed is:

1. A throttle valve for a hydraulic control system of an automatic power transmission of a motor vehicle, comprising a housing formed therein with a cavity, an inlet port into which hydraulic fluid output pressure is produced and which is communicable with a drain, an external valve spool slidably fitted in said cavity and formed therein with a bore and urged in one direction by said output pressure, said bore communicating with said inlet port and being communicable with said outlet port to produce said output pressure therein, biasing means urging said external valve spool in another direction opposite to said one direction, an internal valve spool slidably fitted in said bore and movable in accordance with an output of an engine in said one and another directions to provide fluid communication between said outlet port and said bore and between said outlet port and said drain to increase and decrease said output pressure, said external and internal valve spools having a common neutral position which is constant with respect to each other and in which said output pressure is equal to a throttle pressure varied in accordance with the output of the engine, said external valve spool being responsive to movements of said internal valve spool from said neutral position in said one and another directions to be movable toward said neutral position by said output pressure and the action of said biasing means, respectively.

2. A throttle valve as claimed in claim 1, in which said internal valve spool is constructed and arranged such that said input pressure exerts thereon two identical forces opposite in direction to each other and said internal valve spool is unbiased by said output pressure so that the resultant force acting on said internal valve spool to withstand movement of said internal valve spool is approximately zero.

3. A throttle valve as claimed in claim 1, in which said cavity is formed therein with an end wall engaged by an end of said external valve spool when said internal valve spool is moved in said one direction in excess of a predetermined limit so that said external valve spool is held spaced apart from said neutral position to produce an output pressure equal to said input pressure in said outlet port.

4. A throttle valve as claimed in claim 1, in which said external valve spool is formed with inlet and outlet apertures communicating respectively with said inlet and outlet ports, said outlet aperture being communicable with said drain, and two lands on the area differential between which said output pressure acts to urge said external valve spool in said one direction, and said internal valve spool is formed with an annular groove communicating with said inlet aperture and communicable with said outlet aperture, and first and second opposite lands defining said annular grove and having the same area, said second land providing and obstructing at one end fluid communication between said outlet aperture and said annular groove and at the other end fluid communication between said outlet aperture and said drain.

5. A throttle valve as claimed in claim 4, in which the width of said second land is substantially equal to that of said outlet aperture.

6. A throttle valve as claimed in claim 1, wherein the output of the engine is controlled by an accelerator pedal, in which said internal valve spool is adapted to be connected to said accelerator pedal of said motor vehicle through a linkage mechanism.

\* \* \* \* \*